United States Patent Office 2,784,174
Patented Mar. 5, 1957

2,784,174

CONDENSATION PRODUCTS OF THIOPHENES WITH FORMALDEHYDE AND HYDROXYLAMINE SALTS

Howard D. Hartough, Wilmington, Del., and Everett H. Murray, Jr., Pitman, N. J., assignors to Socony Mobil Oil Company, Inc., a corporation of New York No Drawing. Application July 9, 1952, Serial No. 297,998

14 Claims. (Cl. 260—67)

This invention relates to organic nitrogen-containing compounds. It is more particularly concerned with condensation products produced by the reaction between aldehydes, salts of hydroxlyamine, and certain organic compounds having one or more replaceable hydrogen atoms.

It has been found that the salts of hydroxylamine, aldehydes, and compounds having at least one strongly reactive hydrogen atom react to produce new useful nitrogen-containing compounds. It has been discovered that hydroxylamine salts, aldehydes and organic compounds having active, replaceable hydrogen atoms can be condensed to produce three types of hydroxylamines, and also amines of unknown structure having sub-resinous characteristics.

Accordingly, it is an object of the present invention to provide novel amines and a process for producing them. Another object is to provide sub-resinous amines and thermoplastic resins, and a process for producing them. A specific object is to provide a process for producing thenyl-hydroxylamines. A further specific object is to provide novel thenylhydroxylamines, sub-resinous amines, and thermoplastic resins therefrom. Other objects and advantages of the present invention will become apparent, to those skilled in the art, from the following detailed description.

In general, the present invention provides a process for the production of hydroxylamines, sub-resinous amines, and thermoplastic resins, which comprises condensing a hydroxylamine salt, an aldehyde, and an organic compound having a replaceable, reactive hydrogen atom, at a temperature of between about 10° C. and about 100° C.

The compounds having a replaceable reactive hydrogen atom are generally well known to those skilled in the art. They include heterocyclic compounds having a five-membered ring and oxygen or sulfur as the heterocyclic atoms; six-membered ring heterocyclic compounds; aromatic compounds having ortho- or para-directing substituents; ketones; and keto-acids and their esters. Non-limiting examples of the reactant having a replaceable, active hydrogen atom are furan; methyl-furane; thiophene; butyl-thiophene; dimethyl-thiophene; chlorothiophene; bromo-thiophene; piperidene; butylpiperidine; pyrrole; hydroxypyrrole; phenol; p-cresol; naphthol; anthranol; phenanthrol; acetone; acetophenone; phenylethyl ketone; methyl-butyl ketone; acetylthiophene; acetylfurane; acetoacetic acid; pyroracemic acid; malonic acid; ethylacetoacetate; butyl malonate; and 2-ethylhexyl pyroracemate.

The aldehyde reactant can be any aldhehyde having sufficient activity to enter into condensation reactions, i. e., in general, virtually any aldehyde which is not sterically hindered. Non-limiting examples of the aldehyde reactant are formaldehyde, butyraldehyde, propionaldehyde, acetaldehyde, heptaldehyde, benzaldehyde, chlorobenzaldehyde, furfural, etc. Especially preferred, from the standpoint of economy and of commercial feasibility is formaldehyde, in any of its usual forms, i. e., as the aqueous, solution (formalin), paraformaldehyde, trioxymethylene, etc.

The hydroxylamine reactant is usually, and feasibly, in the form of a salt thereof. Non-limiting examples are hydroxylamine; hydroxylamine hydrochloride, hydroxylamine hydrobromide, hydroxylamine sulfate, hydroxylamine acetate, etc.

The process of the present invention produces hydroxylamines, resins, and sub-resins, in greater or lesser proportions, dependent in the main upon the mode of reacting the aforedescribed reactants. The present invention can be illustrated by a discussion of the products formed from thiophene, formaldehyde, and hydroxylamine hydrochloride. As those skilled in the art will appreciate, other homologous or similar products can be produced when the other, aforedescribed reactants are employed.

When thiophene is reacted with formaldehyde and hydroxylamine hydrochloride, four amines can be formed. For the purposes of this discussion, they are designated as follows:

Amine I.—$C_4H_3S \cdot CH_2NHOH$, 2-thenyl hydroxylamine

Amine II.—$(C_4H_3S \cdot CH_2)_2NOH$, di-(2-thenyl)hydroxylamine

Amine III.—$(CH_2OH \cdot C_4H_2SCH_2)_2NOH$, di-(5-hydroxymethyl-2-thenyl)hydroxylamine Amine IV.—Amines of unknown structure, having sub-resinous characteristics Amine III is a crystalline compound that melts, as the hydrochloride, with decomposition at 158–162° C. (uncorrected) and has a composition corresponding to the formula, as the hydrochloride:

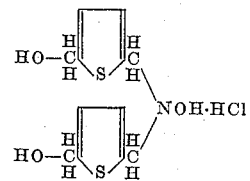

di-(5-hydroxymethyl-2-thenyl)hydroxylamine hydrochloride.

Amine IV is an amine whose hydrochloride is water soluble and occurs in conjunction with amine III. When neutralized with caustic, extracted from the aqueous mixture with benzene, and then freed from benzene solvent, it is a yellow oil that slowly crystallizes to a white semi-solid mass having no sharp melting point.

When mixtures of amine III and IV are freed from their hydrochlorides by treatment with caustic, freed of water by extraction with benzene and digested for about two to about five hours at about 85 to about 95° C. (say on a steam bath), a thick viscous oil of light yellow color is obtained. This oil, when applied to wood or glass in a thin film, dries rapidly, and in about 10 to 20 minutes, usually about 15 minutes, gives a "dust free" finish. It can be used to laminate glass to produce automobile or aircraft windshields, for example, or to laminate wood or cloth. After the original heat treatment (supra) of one to five or six hours, preferably two to five hours, the amine does not respond rapidly to heat treatment at about 100° C. However, when heated at about 150° C. the amine polymerizes with great rapidity. The resinous bodies formed by polymerization of amines III and IV are thermoplastic, clear, and light yellow in color.

The course and the products of the reaction of thiophene and thiophene derivatives with reactive aldehyde, such as formaldehyde, and an hydroxylamine salt, such as the chloride, do not seem to change with variation in reaction temperatures and reaction times. Usually, amines III and IV are obtained. Addition of one reactant to the other two changes the course of the reaction. Thus, when thiophene and hydroxylamine are mixed together and formaldehyde added slowly, i. e., in very small batches, dropwise, good yields of amine II are obtained. Accordingly, it appears at this time that maintaining the formaldehyde concentration in the reaction mixture at a minimum favors formation of amine II over amine III. On the other hand, amine I may be prepared in a pure state by the addition of the hydroxylamine to the formaldehyde in order first to produce the formaldoxime, which in turn reacts with the compound having at least one strongly reactive hydrogen, thiophene, for example, in the present of the hydrochloric acid formed in the first reaction. The course of the reaction under these conditions may be represented by the following equations:

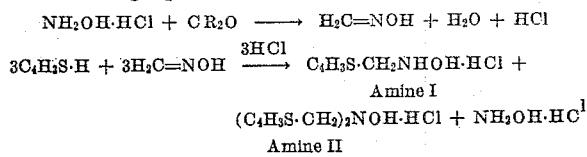

Amine II

Forcing the reaction to take place through the formaldoxime stage is necessary for the production of thenyl-hydroxylamines (amine I) to the relative exclusion of amines III and IV. With substituted thiophenes such as tertiary butylthiophenes and chlorothiophenes, analyses indicate relatively high conversion to a substituted amine I without resorting to the above procedure. Similar-substituted thiophenes, that is, thiophenes having electro-positive substituent groups such as alkyl, halo and alkoxy groups, enter into this reaction.

While, as mentioned hereinbefore, the conditions of time and temperature are not controlling of the type of products formed or the relative proportions thereof, certain ranges are desirable. In general, the temperature will be between about 10° C. and about 100° C. Preferable, the temperature is between about 20° C. and about 85° C. The time of the reaction will vary between about 15 minutes and about five hours, preferably between about 25 minutes and about 3.5 hours.

The relative molar proportions of the reactants can vary over a considerable range. In general, the molar proportions will be about one mole of organic compound having a replaceable hydrogen:0.5 to 5 moles of aldehyde:0.5 to 3 moles of hydroxylamine salt. In preferred practice, the molar proportions will be about 1:1 to 4:1 to 2, respectively.

Pressure is not a crtical factor in the process of this invention. Accordingly, the process can be carried out at subatmospheric, atmospheric, or superatmospheric pressures.

The following examples are for the purpose of demonstating the process of this invention, and the novel amines and resins thereof. It must be strictly understood that this invention is not to be limited by the reactants and conditions used in the examples, or by the operations and manipulations involved. As those skilled in the art will appreciate, a wide variety of other reactants and conditions, as discussed hereinbefore, can be used.

Example 1

To a mixture of 42 parts by weight of thiophene (about 0.5 mole) and 35 parts by weight of hydroxylamine hydrochloride (about 0.5 mole) were added about 15 parts by weight of paraformaldehyde (about 0.5 mole of formaldehyde) and a small amount, sufficient to depolymerize the paraformaldehyde (about 10 parts by weight) of glacial acetic acid. A heat of reaction set in after about 15 minutes and within the following 10 minutes the reaction temperature rose to about 75° C. The reaction mixture was cooled to about 30° C. Thereafter, the reaction mixture was treated with about 30 parts by weight of sodium hydroxide (about 0.67 mole) in a 40 percent aqueous solution to free the amines. The oily liquid layer was dissolved in benzene and the aqueous solution extracted once more with a little benzene. The benzene was evaporated to leave a light yellow viscous oil in the amount of about 53 parts by weight. Analysis of the oil showed a nitrogen content of 11.02 percent and a sulfur content of 26.1 percent. Distillation of the oil resulted in decomposition of it. The distillates likewise decomposed on standing.

Example 2

To a mixture of about 42 parts by weight of thiophene (about 0.5 mole) and about 35 parts by weight of hydroxylamine hydrochloride (about 0.5 mole) were added about 15 parts by weight of paraformaldehyde (about 0.5 mole of formaldehyde). A heat of reaction was noted after about 0.5 hour and the temperature rose from about 40 to about 65° C. in the ensuing two minutes. The reaction mixture was then cooled to room temperature and treated with about 0.5 mole of caustic in an aqueous 40 percent solution to free the amines. The reaction product was dissolved in benzene, separated from the aqueous solution and the benzene removed by distillation. The benzene residue was then distilled and fractions boiling at 65–100° C. and at 100–170° C., both at 5 millimeters of mercury pressure, were obtained. The first fraction was a light yellow liquid having no tendency to decompose, containing 11.29 percent nitrogen and 26.7 percent sulfur. The second fraction was a red oil containing 9.12 percent nitrogen and 28.0 percent sulfur. The residue was a highly polymerized black material resembling coke in appearance. The polymerization or decomposition apparently took place at a temperature above about 150° C.

Example 3

To a mixture of about 42 parts by weight of thiophene (about 0.5 mole) and about 35 parts by weight of hydroxylamine hydrochloride (about 0.5 mole) were added about 42 parts by weight of 36 percent formalin solution (an aqueous solution containing 36 percent formaldehyde). The reaction mixture was heated to reflux at about 76° C. for about 25 minutes. The solution was then clear. Upon cooling, a white crystalline material began to separate. Upon filtration there were obtained 21 parts by weight of solid material that after recrystallization from water melted at 158 to 162° C. with decomposition. An analysis of the recrystallized material indicated that it contained 44.2 percent carbon, 4.1 percent hydrogen, 11.00 percent chlorine, 4.6 percent nitrogen and 20.3 percent sulfur. These values are compared for the theoretical values for amine III, $C_{12}H_{16}ClNO_3S_2$ as follows:

| | $C_{12}H_{16}ClNO_3S_2$ | |
| --- | --- | --- |
| | Calculated | Found |
| Percent Carbon | 44.7 | 44.2 |
| Percent Hydrogen | 4.9 | 4.1 |
| Percent Nitrogen | 4.4 | 4.6 |
| Percent Sulfur | 20.0 | 20.3 |
| Percent Chlorine | 11.0 | 11.0 |

Example 4

To about 544 parts by weight of thiophene (about 6.48 moles) were added about 454 parts by weight of hydroxylamine hydrochloride. To the mixture thus formed were added about 540 parts by weight of aqueous 36 percent formalin solution (about 6.48 moles of formaldehyde) during a period of about 5 minutes. The heat of reaction that was produced raised the temperature to about 65° C. Thereafter the temperature was held at about 65 degrees by use of an ice bath. After about 10 minutes the heat of reaction had subsided and the temperature of the reaction mixture began to fall. The reaction mixture was allowed to cool to room temperature (about 25 to about 30 degrees centigrade) during a period of about three hours. Material separated out and was removed by filtration. About 408 parts by weight were obtained of which about 100 parts by weight were recrystallized from about 300 parts by weight of water to provide a pure white crystalline material. About 95 parts by weight of thiophene were recovered from the filtrate. The amines in the aqueous filtrate were freed by treatment with an aqueous 40 percent sodium hydroxide solution, extracted with benzene and the free amine recovered as a residue by evaporation of the benzene at temperatures below about 100° C. About 345 parts by weight were obtained. The recrystallized white crystalline solid was analyzed. It proved to be di(2-thenyl)hydroxylamine hydrochloride, melting point, 160–162° C. (with decomposition).

|  | $(C_4H_3S\cdot CH_2)_2NOH\cdot HCl$ | |
| --- | --- | --- |
|  | Calculated | Found |
| Percent Sulfur | 24.5 | 24.6 |
| Percent Nitrogen | 5.4 | 5.2 |
| Percent Chlorine | 13.5 | 13.0 |

This amine hydrochloride when freed by sodium hydroxide treatment and recrystallized from benzene and petroleum ether melted at 60–62° C. When analyzed it proved to be di-(2-thenyl)hydroxylamine.

|  | $(C_4H_3S\cdot CH_2)_2NOH$ | |
| --- | --- | --- |
|  | Calculated | Found |
| Percent Sulfur | 28.4 | 28.1 |
| Percent Nitrogen | 6.2 | 6.0 |
| Percent Carbon | 53.3 | 53.0 |
| Percent Hydrogen | 4.9 | 4.7 |

*Example 5*

About one mole each of thiophene, aqueous formaldehyde and hydroxylamine hydrochloride were mixed together and reacted as in Example 3. From the reaction mixture about 0.39 mole of unreacted thiophene was recovered. The reaction mixture was treated with aqueous caustic solution and extracted with benzene. The benzene extract was evaporated on a steam bath to remove the benzene. The residue was a light yellow oil which was heat treated on the steam bath for 5 hours. Heat treatment of the oil "bodied" it. A 10 percent solution of the heat treated or "bodied" sub-resinous material was prepared in toluene and applied to a glass panel. In a thin film the sub-resinous material dried rapidly and provided a "dust free" finish in about 15 minutes. The film was colorless and appeared to be light stable for at least three weeks. Those skilled in the art will appreciate that the "bodied" sub-resinous bodies therefore can be used to produce laminated glass bodies such as "safety" glass and the like.

Heat treatment of the reaction product is best carried out in the presence of air as is manifest from the following results. A sample of the original oil was heat treated in a relatively low wall evaporating dish at 100° C. After about five hours of heat treatment a pale yellow thermoplastic resinous body was obtained. A similar sample was heat treated in a relatively high wall beaker whereby contact with the air was lessened. Five hours heat treatment of the reaction product in the beaker failed to produce as highly polymerized material as the treatment in the evaporating dish. A small sample of the material heat treated in the beaker decomposed violently after heating at 150° C. in an oven for 20 minutes leaving only a small amount of black resinous material.

*Example 6*

To a mixture of about 0.5 mole of thiophene and about 0.5 mole of aqueous formalin solution (36 percent $CH_2O$) about 0.5 mole of hydroxylamine acid sulfate was added. A slight heat of reaction raised the temperature from about 25° C. to about 40° C. The reaction mixture was then refluxed for about 30 minutes at a temperature of about 74 to about 84° C. The mixture was then cooled, treated with aqueous caustic, extracted with benzene, the benzene extract evaporated to remove benzene and the residue digested on a steam bath at about 90 to about 95° C. for two hours. When the digested material was applied as a film to a glass panel and baked for about two hours at about 100° C., a light brown resin finish was produced on the panel by the baking operation. This finish is extremely hard and has practically no tendency to chip or to flake off the glass. It is manifest that this material after baking has a high adherescence for glass.

*Example 7*

About 83.2 parts by weight of 36 percent aqueous formalin solution (about one mole of formaldehyde) and about 70 parts by weight of hydroxylamine hydrochloride (about one mole) were mixed, producing sufficient heat of reaction to cause the temperature of the mixture to rise from 28° C. to 39° C. in five minutes. After the heat of the reaction had subsided, no odor of formaldehyde could be detected but the odor of hydrochloric acid was quite strong. Thereafter about 84 parts by weight of thiophene (about one mole) was added to the mixture whereupon the temperature of the mixture rose to about 53° C. in one hour. The reaction mixture was stirred for about 2.5 hours and cooled to about 5° C. to induce crystallization of a product. About 24 parts by weight of solid material, amine II as the hydrochloride was filtered off and dried. The bases in the filtrate were freed by reaction with 40 percent aqueous caustic soda and the bases extracted with benzene. The extract was evaporated and a crystalline product separated. This second crystalline product was recrystallized from thiophene and petroleum ether to produce pure white, plate-like crystals having a melting point of 58 to 60 degrees centigrade (uncorrected). Analysis of this crystalline product showed it to be amine I, $C_4H_3S\cdot CH_2NH\cdot OH$.

|  | $C_4H_3S\cdot CH_2NHOH$ | |
| --- | --- | --- |
|  | Calculated | Found |
| Percent Nitrogen | 10.8 | 10.6 |

*Example 8*

To a mixture of about 35 parts by weight of tertiary butylthiophene (about 0.25 mole) and about 20.8 parts by weight of a 36 percent aqueous formalin solution (about 0.25 mole of formaldehyde) were added about 17.5 parts by weight of hydroxylamine hydrochloride (about 0.25 mole). The temperature of the reaction mixture rose from room temperature to about 35° C. in about five minutes. After the heat of reaction had subsided the mixture was heated to the reflux temperature which was maintained for about 30 minutes. The reaction mixture then was allowed to cool slowly to room temperature. After standing about 16 hours at room temperature (about 25 to about 30° C.), pink-white crystals settled out and were separated from the reaction mixture. The yield of crude product was about 23 parts by weight. The crude product contained 15.3 percent of sulfur, 5.28 percent of nitrogen and 13.1 percent of chlorine. The crystals were washed with benzene and the washings added to the filtrate from the crude product. The benzene was evaporated off leaving about 53 parts by weight of a viscous, liquid product containing 15.7 percent of sulfur, 5.10 percent of nitrogen and 11.8 percent of chlorine. The theoretical values for 5-tertiary butyl-2-thenyl hydroxylamine hydrochloride are 14.4 percent of sulfur, 6.3 percent of nitrogen and 16.0 percent of chlorine and for di-(5-tertiary butyl-2-thenyl)-hydroxylamine hydrochloride are 17.7 percent of sulfur, 3.9 percent of nitrogen and 10.0 percent of chlorine. The analyses of the two products indicate that both products are mixtures of amine I and amine II.

*Example 9*

To a mixture of about 30 parts by weight of chlorothiophene (about 0.25 mole) and 20.8 parts by weight of 36 percent aqueous formalin solution (about 0.25 mole of formaldehyde) was added about 17.5 parts by weight of hydroxylamine hydrochloride (about 0.25 mole). The temperature rose from room temperature (about 28° C.) to about 36° C. in about five minutes. After the heat of reaction had subsided the reaction mixture was brought to the reflux temperature (about 94° C.) in about 10 minutes. The reflux temperature was maintained for about 30 minutes and the reaction mixture then allowed to cool slowly. After standing at room temperature for about 16 hours yellow crystals settled out. The reaction mixture was filtered and the yellow crystals washed with benzene and dried. About 16 parts by weight of dry product was obtained which contained 16.1 percent of sulfur, 6.53 percent of nitrogen and 30.4 percent of chlorine.

The benzene washings from the crystals was evaporated to obtain a red, viscous liquid (containing a small amount of an orange solid) representing about 24 parts by weight and containing about 5.8 percent of nitrogen and about 30.6 percent chlorine.

The theoretical composition of 5-chloro-2-thenyl hydroxylamine hydrochloride is 16.0 percent sulfur, 7.0 percent nitrogen and 35.5 percent chlorine. Accordingly, it would appear that the red liquid and the crystals each are mixtures of amines corresponding to amines I and II.

*Examples 10 through 14*

The following tabulation summarizes the data obtained in preparing products of the amine IV type. The products were sub-resinous and benzene soluble with a tendency to polymerize rapidly to thermoplastic resins or films on bodying with heat and/or contact with air.

| Example No. | Thiophene | Moles Used Formaldehyde | Hydroxylamine Hydrochloride | Analyses of Amine IV |
|---|---|---|---|---|
| 10 | 0.5 | 0.5 | 0.5 | Percent S=23.1. Percent N=8.79. (Decomp.) |
| 11 | 0.5 | 1.5 | 0.5 | (a) Benzene Soluble, Percent S=17.9. Percent N=2.8. (b) Benzene Insoluble, Percent S=20.8. Percent N=7.0. |
| 12 | 0.5 | 2.0 | 1.0 | Percent S=13.7. Percent N=9.4. |
| 13 | 0.5 | 2.0 | 0.5 | Percent S=19.1. Percent N=6.9. |
| 14 | 0.5 | 1.0 | 1.0 | Percent S=18.9. Percent N=10.5. |

*Example 15*

To a mixture of about 68 parts by weight of furan (about one mole) and about 70 parts by weight of hydroxylamine hydrochloride (about one mole) about 81 parts by weight of aqueous 36 percent formalin (about one mole) were added slowly during about one hour. During this period the temperature rose from about 20° C. to about 32° C. After the addition of the formalin the reaction mixture was stirred for about an hour. The bases in the reaction mixture were freed by reaction with 40 percent aqueous caustic soda and extracted with benzene. The benzene was evaporated to provide a yield of about 54 parts by weight of product containing 8.63 percent of nitrogen. Evaporation of the aqueous solution under vacuum after extraction with benzene produced a dark brown resinous body.

*Example 16*

To a mixture of about 35 parts by weight of hydroxylamine hydrochloride (about 0.5 mole) and about 47 parts by weight of phenol (about 0.5 mole) were added slowly about 41.6 parts by weight of aqueous 36 per cent formalin solution (about 0.5 mole of formaldehyde). The temperature was maintained at about 20° C. to about 30° C. by cooling. After the addition of the formalin the solution was stirred for about 3.5 hours at about 24° to about 36° C. The reaction mixture then was heated to and maintained at about 55 to about 58° C. for about two hours. The reaction mixture was allowed to cool slowly. After standing for about 16 hours, no crystals separated and the mixture was reacted with about 20 parts by weight of sodium hydroxide. The alkaline aqueous reaction mixture was extracted with benzene. The benzene extract was evaporated on a steam bath to provide 56 parts by weight of a residue which was a light red oil containing 6.26 percent of nitrogen. The product was soluble in xylene with difficulty but a warmed, saturated solution when cooled and applied to glass dried to give a dust-free surface in about 15 minutes. When a portion of the product was warmed for about 10 minutes a thermoplastic light red resin was produced.

*Example 17*

To a mixture of 58 parts by weight of acetone (about one mole) and 83.2 parts by weight of 36 percent aqueous formalin solution (about one mole of formaldehyde) about 70 parts by weight of hydroxylamine (about one mole) were added. The temperature rose from room temperature (about 25° C.) to reflux temperature (about 70° C.). After about five minutes the reaction temperature had to be controlled by cooling with an ice bath. After the heat of reaction subsided, the reaction mass was allowed to come to room temperature. Since no solid material was present, the reaction mixture was treated with about 100 parts by weight of aqueous 40 percent sodium hydroxide solution and extracted with benzene. The extraction was not complete because the benzene extracted only a small portion at each extraction. Extraction with ether and petroleum ether gave no product. Partial extraction of the product and subsequent evaporation of the benzene gave 27 parts by weight of a yellow viscous oil containing 10.43 percent of nitrogen. A 2,4-dinitrophenyl hydrazone of the product had a melting point of 178 to 180° C. by the block method.

The foregoing examples illustrate the reaction of a compound having a strongly reactive hydrogen, an active aldehyde and hydroxylamine in neutral or slightly acid media. It will be appreciated from the examples that novel nitrogenous bodies of crystalline or sub-resinous or resinous character are produced. The sub-resinous and resinous products are useful as coating materials and in the lamination of glass as for windshields and the like.

This application is a continuation-in-part of a copending application of the same inventors, Serial Number 670,031, filed May 15, 1946, now abandoned.

Although the present invention has been described in conjunction with preferred embodiments, it is to be understood that modifications and variations may be resorted to, without departing from the spirit and scope of this invention. Such variations and modifications are considered to be within the scope and purview of the appended claims.

What is claimed is:

1. A process for producing hydroxylamines and nitrogenous sub-resins, which comprises reacting (A) an organic compound having a replaceable hydrogen atom selected from the group consisting of thiophene, tertiary butylthiophene, and chlorothiophene, (B) formaldehyde, and (C) a hydroxylamine salt, in a molar proportion of about one mole of A: between about one mole and about four moles of B: between about one mole and about two moles of C, at a temperature of between about 10° C. and about 100° C. and separating from the resultant reaction mass a product selected from the group consisting of thenyl hydroxylamines and nitrogenous sub-resins.

2. A process for producing nitrogenous resins, which comprises reacting (A) an organic compound having a replaceable hydrogen atom selected from the group consisting of thiophene, tertiary butylthiophene, and chlorothiophene, (B) formaldehyde, and (C) a hydroxylamine hydrohalide, in a molar proportion of about one mole of A: between about one mole and about four moles of B: between about one mole and about two moles of C, at a temperature of between about 20° C. and about 85° C., separating the nitrogenous sub-resin, and heat-bodying said sub-resin to produce a thermoplastic resin.

3. A process for producing di-(2-thenyl)hydroxylamine, which comprises first reacting formaldehyde and hydroxylamine hydrochloride in a molar proportion of about 1:1, then reacting the product thus produced with thiophene in a molar proportion of one mole of thiophene per mole of hydroxylamine hydrochloride, at a temperature of between about 20° C. and about 85° C., separating dithenyl hydroxylamine hydrochloride from the reaction mass, neutralizing said reaction mass with alkali metal hydroxide, and extracting di-(2-thenyl)hydroxylamine from the neutralized reaction mass.

4. A process for producing a nitrogenous resin, which comprises reacting thiophene, formaldehyde, and hydroxylamine hydrochloride, in a molar proportion of about 1:1:1, respectively, at a temperature of between about 20° C. and about 85° C., separating a nitrogenous sub-resin from the reaction mass, and heat-bodying said nitrogenous sub-resin to produce a nitrogenous thermoplastic resin.

5. A process for producing tertiary butylthenyl hydroxylamines, which comprises reacting tertiary butylthiophene, formaldehyde and hydroxylamine hydrochloride, in a molar proportion of about 1:1:1, respectively, at the reflux temperature of the reaction mixture, and separating tertiary butylthenyl hydroxylamine and di-(tertiary butylthenyl)hydroxylamine from the reaction mass.

6. A process for producing chloroethenyl hydroxylamines, which comprises reacting chlorothiophene, formaldehyde, and hydroxylamine hydrochloride, in a molar proportion of about 1:1:1, respectively, at the reflux temperature of the reaction mixture, and separating chlorothenyl hydroxylamine and di-(chlorothenyl)-hydroxylamine from the reaction mass.

7. A process for producing di-(5-hydroxymethyl-2-thenyl)hydroxylamine, which comprises reacting thiophene, formaldehyde, and hydroxylamine hydrochloride, in a molar proportion of about 1:1:1, respectively, at the reflux temperature of the reaction mixture, and separating di-(5-hydroxymethyl-2-thenyl)hydroxylamine from the reaction mass.

8. A nitrogenous product produced by the process which comprises reacting (A) an organic compound having a replaceable hydrogen atom selected from the group consisting of thiophene, tertiary butylthiophene, and chlorothiophene, (B) formaldehyde, and (C) a hydroxylamine salt, in a molar proportion of about one mole of A:between about one mole and about four moles of B:between about one mole and about two moles of C, at a temperature of between about 10° C. and about 100° C. and separating from the resultant reaction mass a product selected from the group consisting of thenyl hydroxylamines and nitrogenous sub-resins.

9. Nitrogenous resins produced by the process which comprises reacting (A) an organic compound having a replaceable hydrogen atom selected from the group consisting of thiophene, tertiary butylthiophene, and chlorothiophene, (B) formaldehyde, and (C) a hydroxylamine hydrohalide, in a molar proportion of about one mole of A:between about one mole and about four moles of B:between about one mole and about two moles of C, at a temperature of between about 20° C. and about 85° C., separating the nitrogenous sub-resin, and heat-bodying said sub-resin to produce a thermoplastic resin.

10. A nitrogenous resin produced by the process which comprises reacting thiophene, formaldehyde, and hydroxylamine hydrochloride, in a molar proportion of about 1:1:1, respectively, at a temperature of between about 20° C. and about 85° C., separating a nitrogenous sub-resin from the reaction mass, and heat-bodying said nitrogenous sub-resin to produce a nitrogenous thermoplastic resin.

11. 2-thenyl hydroxylamine having a melting point of between about 58° C. and about 60° C.

12. Di-(2-thenyl)hydroxylamine hydrochloride having a melting point of between about 160° C. and about 162° C., with decomposition.

13. Di-(2-thenyl)hydroxylamine having a melting point of between about 60° C. and about 62° C.

14. Di-(5-hydroxymethyl-2-thenyl)hydroxylamine hydrochloride having a melting point of between about 158° C. and about 162° C.

References Cited in the file of this patent

UNITED STATES PATENTS

| | | |
|---|---|---|
| 2,161,808 | Finlayson et al. | June 13, 1939 |
| 2,500,822 | Hartough et al. | Mar. 14, 1950 |

OTHER REFERENCES

Morsch: Monatshefte fur Chemie, vol. 55, 1930, pp. 144–146.

Beilsteins: Handbuch der Organischen Chemie, 4th ed., 1932, vol. 15, page 37.

Ellis: The Chemistry of Synthetic Resins, Reinhold, vol. I, 1935, page 527.

Holdren et al.: Journal American Chem. Soc., vol. 68, 1946, pp. 1198–1200.